N. EARLYWINE.
Improvement in Wheel Cultivators.

No. 122,373. Patented Jan. 2, 1872.

Witnesses:
John Becker.
Francis McArdle.

Inventor:
N. Earlywine
PER Munn & Co.
Attorneys.

UNITED STATES PATENT OFFICE.

NATHAN EARLYWINE, OF CENTERVILLE, IOWA, ASSIGNOR TO HIMSELF AND CHARLES A. DAVIS, OF ST. LOUIS, MISSOURI.

IMPROVEMENT IN WHEEL-CULTIVATORS.

Specification forming part of Letters Patent No. 122,373, dated January 2, 1872.

*To all whom it may concern:*

Be it known that I, NATHAN EARLYWINE, of Centerville, in the county of Appanoose and State of Iowa, have invented a new and Improved Cotton-Chopper and Cultivator; and I do hereby declare that the following is a full, clear, and exact description thereof, which will enable others skilled in the art to make and use the same, reference being had to the accompanying drawing forming a part of this specification.

My invention relates to an improvement in the class of machines designed for use in cultivating cotton, and chiefly distinguished by a combination of rotary choppers, adjustable scrapers, and furrow or track-openers. The improvement consists, mainly, in the arrangement of a set of cultivators whose V-shaped stock is bolted to a pendent bar of the main frame of the machine, so as to allow of their adjustment vertically. The invention also consists in the arrangement of said cultivators with reference to scrapers, whereby the surface of the ground is first furrowed or pulverized slightly and then scraped or cleaned off so as to leave it in the best condition to produce the desired result.

Figure 1:
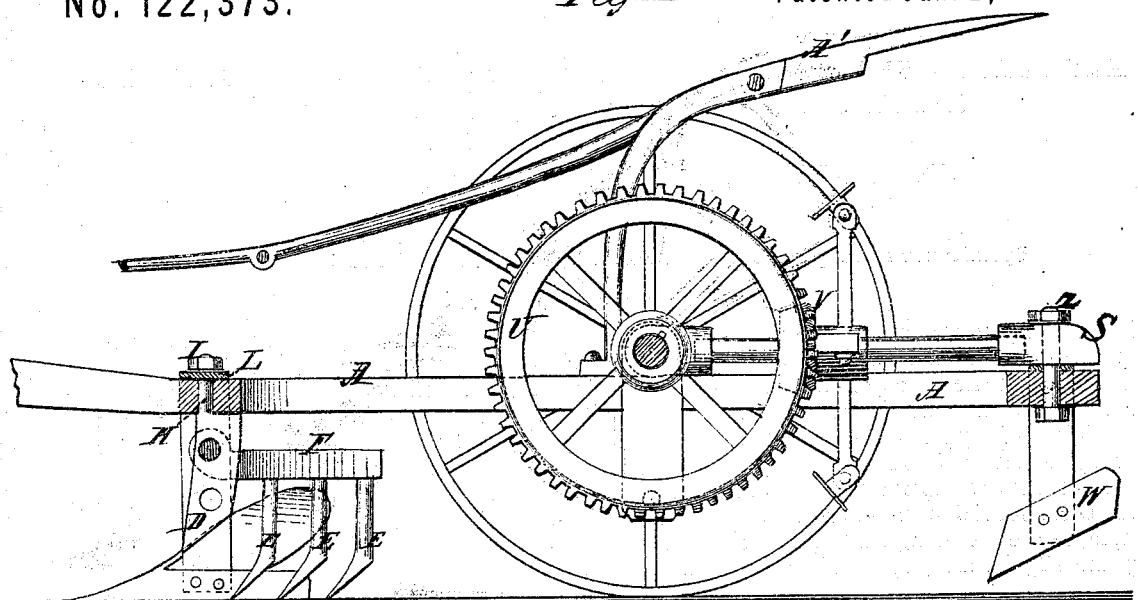
Figure 2:
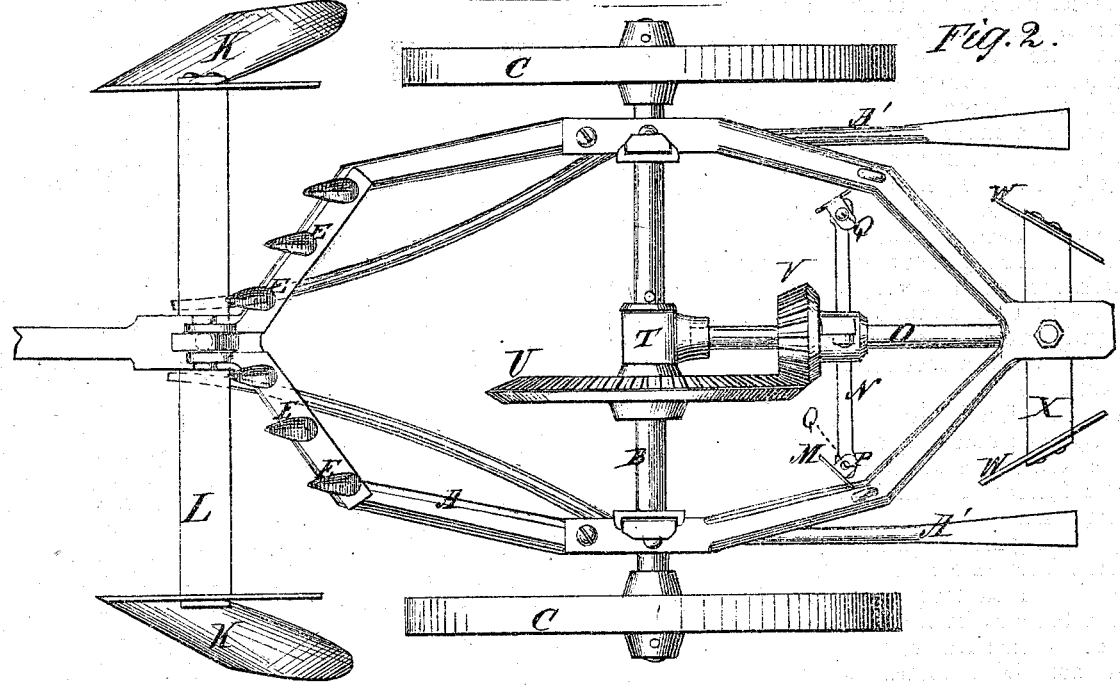

Figure 1 is a longitudinal sectional elevation of my improved machine, and Fig. 2 is a plan of the bottom of the same.

Similar letters of reference indicate corresponding parts.

A is a strong metal frame of elliptical form, mounted on the axle B of the truck-wheel C, as shown, with the longest diameter in the direction of the movements of the machine. To the front of this frame, which has a strong pendent bar, D, I attach the cultivators E by bolting the stocks F, to which said cultivators are attached, to said bar, as shown, so that the ridge on which the row is planted will be cultivated on each side of the row over which the center of the machine passes, the space between the two sets of cultivators allowing it to escape the cultivators. The pendent bar D has several holes, one above another, to admit of adjusting the cultivators higher or lower on it, as may be required, and said bar is secured to the machine by a post, H, extending up through a vertical hole and receiving a screw-nut, I. K represents plows, which are attached by the yoke L, so that one will run in front of each wheel and prepare a smooth and even track for said wheels at the same time that they turn the grass and weeds outside of the part acted on by the cultivators away from the row or to the center of the space between the rows. This yoke is secured to the frame by the part H of bar D and the nut I, so as to be readily taken off when required. The chopping is done by the hoes or choppers M attached to the revolving arm N of shaft O, said choppers being bolted to said arms by the ears P and bolts Q in such manner that they may be set obliquely or parallel to the shaft, as may be found best in practice. I prefer to arrange them as shown, to throw the plants and earth taken up partly backward and partly sidewise of the machine, so as to clear the wheels and not throw onto the next rows. This shaft O has a bearing at one end in a block, S, bolted detachably to the rear end of the frame, and at the other end in the block T, sliding on the shaft up to the driving-wheel U, and held by a pin and washer or other means. This wheel U being made fast to the axle and turned by it gears with the pinion V on the shaft O and turns the latter. W represents the scrapers for scraping after the cultivators and choppers have done their work. They are suspended from the rear end of the frame by the yoke X, which is made fast by the same bolt y and nut Z that secures the block S. The wheel U being made fast to the axle I employ another axle for the dropping or planting machine, to be substituted for the one here shown when the planting devices are to be used. The bars A' are employed for attaching wood handles to be used for guiding the machine.

I propose to use the machine also for cultivating only when the chopper is not required. The chopping apparatus being detached it is applicable for cultivating corn as well as cotton.

I do not claim a combination of cultivators or plows and scrapers in a cotton-cultivating machine; but What I do claim as novel and of my invention is—

1. The cultivators E E E, fixed in the V-shaped stock F, which is bolted to the pendent bar D so as to be vertically adjustable, as shown and described, and so as to rise and fall with the inequalities of the ground.

2. In combination with the elements of the first claim, I claim the scrapers W W, when arranged to operate as specified.

NATHAN EARLYWINE.

Witnesses:
AMOS HARRIS,
KOS. HARRIS.

(43)